US010831347B2

(12) United States Patent
Mokrzycki et al.

(10) Patent No.: US 10,831,347 B2
(45) Date of Patent: Nov. 10, 2020

(54) COGNITIVE COMPUTING TO IDENTIFY KEY EVENTS IN A SET OF DATA

(71) Applicant: International Business Machines Corporation, Armonk, NY (US)

(72) Inventors: Laura J. Mokrzycki, Zumbrota, MN (US); Paul Gerver, Rochester, MN (US); Rachel Mertz, Rochester, MN (US); Cameron Cornick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/280,902

(22) Filed: Feb. 20, 2019

(65) Prior Publication Data
US 2020/0264746 A1     Aug. 20, 2020

(51) Int. Cl.
| | |
|---|---|
| G06F 3/048 | (2013.01) |
| G06F 3/0484 | (2013.01) |
| G06K 9/00 | (2006.01) |
| G06N 5/04 | (2006.01) |
| G10L 15/26 | (2006.01) |
| G06F 40/40 | (2020.01) |

(52) U.S. Cl.
CPC ............ *G06F 3/0484* (2013.01); *G06F 40/40* (2020.01); *G06K 9/00711* (2013.01); *G06N 5/043* (2013.01); *G10L 15/265* (2013.01); *G06K 2009/00738* (2013.01)

(58) Field of Classification Search
CPC ... G06F 3/0484; G06F 17/28; G06K 9/00711; G06N 5/043; G10L 15/265

USPC ........................................................ 715/716
See application file for complete search history.

(56) References Cited

U.S. PATENT DOCUMENTS 7,046,914 B2    5/2006   Jasinschi et al.
8,296,297 B2   10/2012   Green et al.
(Continued)

FOREIGN PATENT DOCUMENTS

| | | | | |
|---|---|---|---|---|
| CA | 2752307 A1 | 3/2012 | | |
| WO | WO-2014060843 A2 * | 4/2014 | ........... | G06F 16/784 |

OTHER PUBLICATIONS

Guo et al., "Finding the Storyteller: Automatic Spoiler Tagging using Linguistic Cues," Proceedings of the 23rd International Conference on Computational Linguistics, Aug. 2010, pp. 412-420.
(Continued)

*Primary Examiner* — David Phantana-angkool
(74) *Attorney, Agent, or Firm* — Yee & Associates, P.C.

(57) ABSTRACT

A method, apparatus, system, and computer program product for detecting and obscuring references that inadvertently disclose key events according to a user's progress through a media. A computer system ingests data from the media and conceptualizes events from the data. The computer system identifies the key events in the media based on the conceptualized events. The computer system assigns a value to each identified key event. The computer system intakes the data that tracks a progression through the media. The computer system identifies references in related content data that are associated with the key events having values that exceeds a threshold. The computer system obscures the references to the key events displayed in the related content data according to the progression through the media.

17 Claims, 6 Drawing Sheets

(56) References Cited

U.S. PATENT DOCUMENTS

| | | | |
|---|---|---|---|
| 10,083,720 B2* | 9/2018 | Zhou | G11B 27/10 |
| 10,264,175 B2* | 4/2019 | Cronin | H04N 1/00145 |
| 10,467,279 B2* | 11/2019 | Moore | G06F 16/44 |
| 10,521,855 B2* | 12/2019 | Cao | G06Q 30/0623 |
| 10,534,978 B2* | 1/2020 | Bhat | G06K 9/00684 |
| 2004/0168205 A1 | 8/2004 | Nesvadba et al. | |
| 2012/0072941 A1 | 3/2012 | Thornberry et al. | |
| 2014/0101244 A1 | 4/2014 | Klien et al. | |
| 2014/0105466 A1* | 4/2014 | Botes | G06K 9/00221 382/118 |
| 2014/0181197 A1 | 6/2014 | Baggott | |
| 2014/0214980 A1 | 7/2014 | Jung | |
| 2015/0004014 A1 | 1/2015 | Kim et al. | |
| 2015/0007014 A1 | 1/2015 | Allen | |
| 2016/0283483 A1* | 9/2016 | Jiang | G06F 16/24578 |
| 2016/0308847 A1* | 10/2016 | Moore | G06Q 50/01 |
| 2017/0091584 A1* | 3/2017 | Bhat | G06K 9/6218 |
| 2018/0232830 A1* | 8/2018 | Dorenkamp | G06Q 50/205 |
| 2019/0378351 A1* | 12/2019 | Dorenkamp | G07C 5/0808 |

OTHER PUBLICATIONS

Jeon et al., "Don't Be Spoiled by Your Friends: Spoiler Detection in TV Program Tweets," Proceedings of the Seventh International AAAI Conference on Weblogs and Social Media, 2013, pp. 681-684.

Boyd-Graber et al., "Spoiler Alert: Machine Learning Approaches to Detect Social Media Posts with Revelatory Information," ASIST 2013, Nov. 1-6, 2013, 9 pages.

Divakaran, "Multimedia Content Analysis: Theory and Applications," 1st ed., Springer, 2009, 375 pages.

* cited by examiner

COGNITIVE COMPUTING TO IDENTIFY KEY EVENTS IN A SET OF DATA

BACKGROUND

1. Field

This disclosure relates generally to image, speech, and natural language systems and, more specifically, to a method, apparatus, system, and computer program product for detecting key events in a set of data and obscuring the detected key events in online content.

2. Description of the Related Art

It is becoming increasingly difficult to avoid learning of plot twists, big reveals, important events and other references to key events from books, TV shows and other media when on social media or online. Prior art systems are able to warn users of potentially inadvertent disclosure of key events. However, these systems rely on the users themselves to identify what event references are considered to reference key events which other users might like to avoid.

Therefore, it would be desirable to have a method and apparatus that take into account at least some of the issues discussed above, as well as other possible issues. For example, it would be desirable to have a method and apparatus that overcome a technical problem with detecting and obscuring inadvertent disclosure of key events according to a user's progress through a media.

SUMMARY

According to one embodiment of the present invention, a method detects and obscures inadvertent disclosure of key events according to an identified progress through a media. Data from the media is ingested and events from the data are conceptualized. Key events are identified in the media based on the conceptualized events. A value is assigned to each identified key event. Data is identified that tracks a progression through the media. References to key events are identified in related content data that are associated with key events having values that exceeds a threshold. The references to the key events are obscured when displayed in the related content data according to the progression through the media.

According to another embodiment of the present invention, a computer system is configured to detect and to obscure references to key events in related content data according to an identified progress through a media. The computer system ingests data from the media and conceptualizes events from the data. The computer system identifies key events in the media based on the conceptualized events. The computer system determines a value for each identified key event. The computer system intakes data that tracks an individual user's progress in media. The computer system identifies references to key events in content data associated with the media. The computer system obscures the references to the key events displayed in the related content data according to the user's progress through the media.

DETAILED DESCRIPTION

Figure 1:
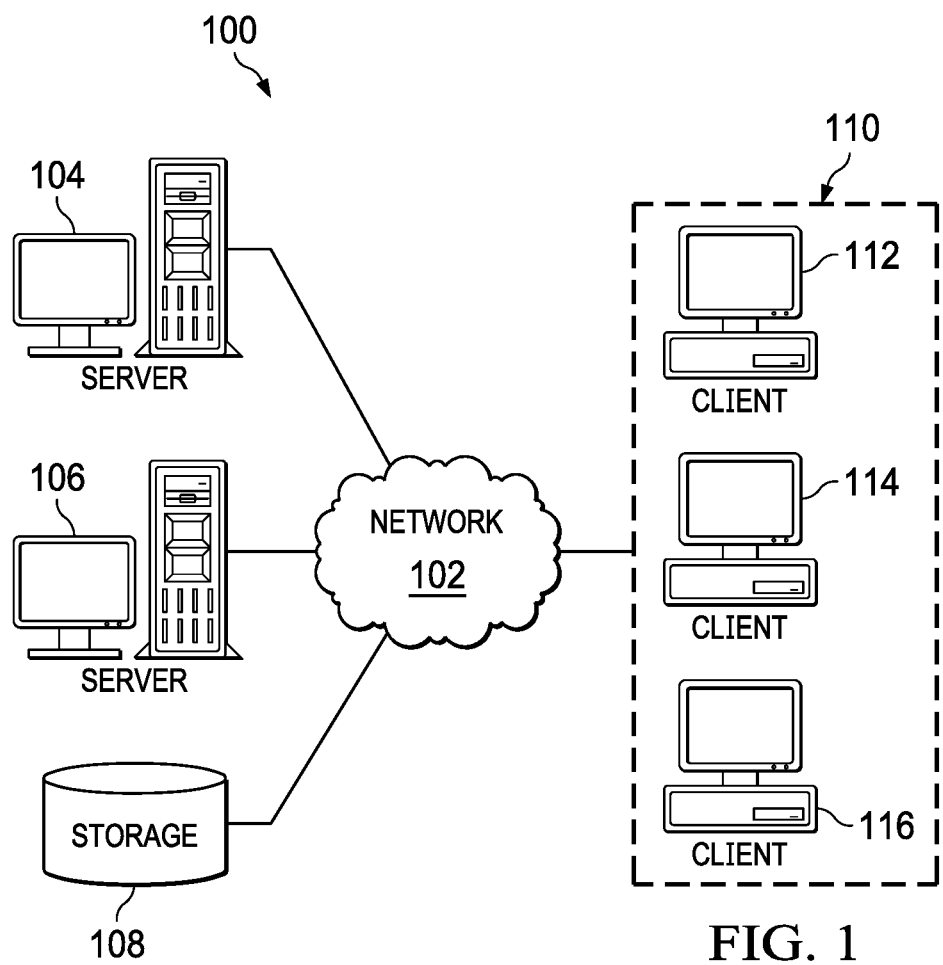
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide a method, apparatus, system, and computer program product for tracking a user's progress through media content according to the indexed story arc of conceptualized events. In one illustrative example, a computer system detects and obscures references to key events in related content data according to an identified progress through a media. The computer system ingests data from the media content. The computer system conceptualizes events from the ingested data. The computer system identifies key events in the media based on the conceptualized events. The computer system determines a value for each identified key event. The computer system intakes data that tracks a progression through the media. The computer system identifies references in related content data that are associated with key events having values that exceeds a threshold. The computer system obscures the references displayed in the related content data according to the progression through the media.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110.

In this illustrative example, server computer 104, server computer 106, storage 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer-recordable storage medium and downloaded to a data processing system or other device for use. For example, the program code may be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and may be comprised entirely of organic components, excluding a human being. For example, the processes may be implemented as circuits in organic semiconductors.

As used herein, "a number of," when used with reference to items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, and without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, and without limitation, two of item A; one of item B; and ten of item C; four of item B and seven of item C; or other suitable combinations.

Figure 2:
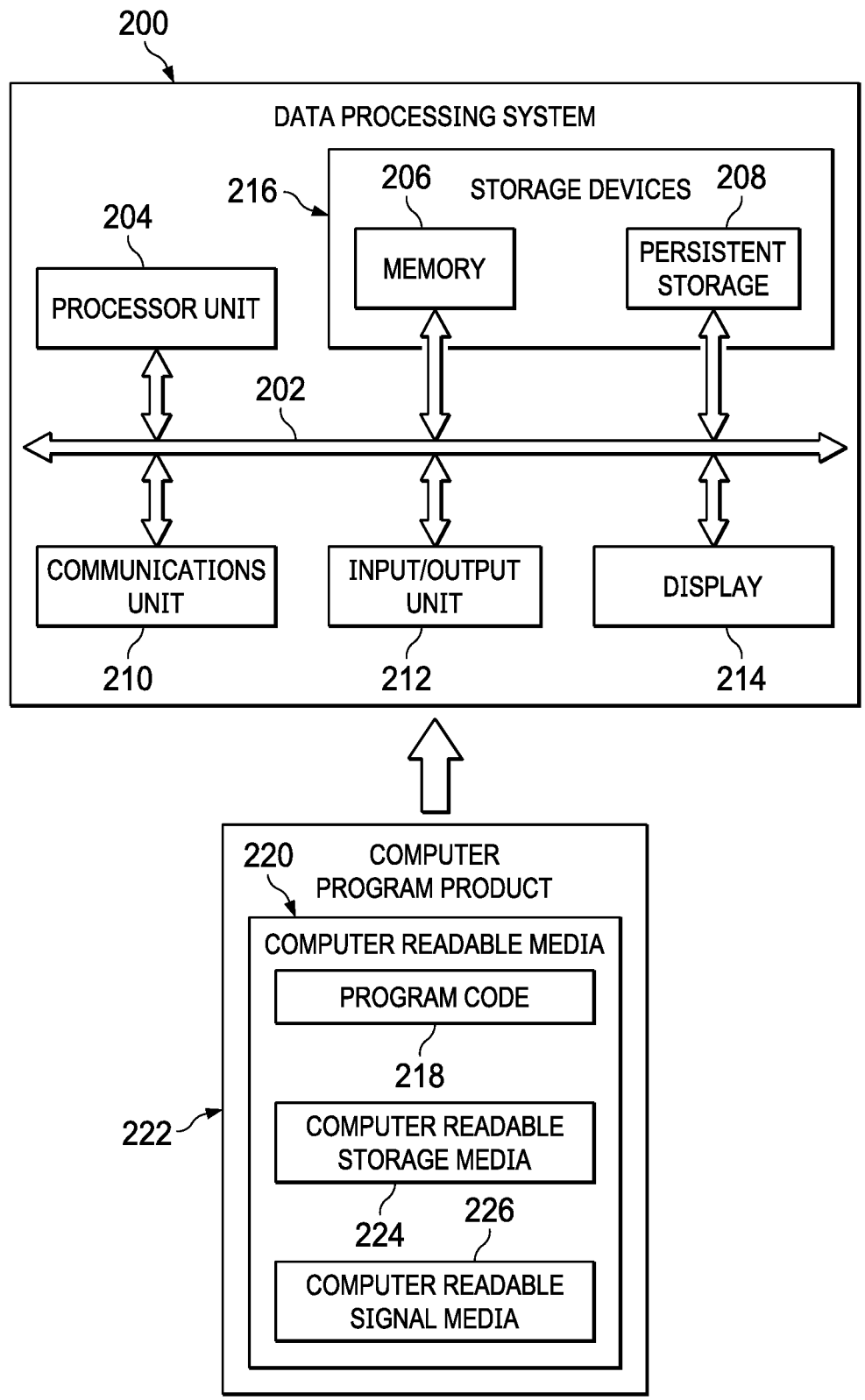
FIG. 2 is a block diagram of a data processing system in accordance with an illustrative embodiment.

With reference now to FIG. 2, a diagram of a data processing system is depicted in accordance with an illustrative embodiment. Data processing system 200 is an example of a computer, such as server computer 104 in FIG. 1, in which computer readable program code or instructions implementing processes of illustrative embodiments may be located. Data processing system 200 provides services to client devices, such as, clients 112, 114, and 116 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, and without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a data processing system may be downloaded over a network from the data processing system to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components, excluding a human being. For example, a storage device may be comprised of an organic semiconductor.

As another example, a computer readable storage device in data processing system 200 is any hardware apparatus that may store data. Memory 206, persistent storage 208, and computer readable storage media 224 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure will include a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, and for example, mobile phones, laptops, and/or personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, a country, state, or data center. Rapid elasticity provides for capabilities that can be rapidly and elastically provisioned, and in some cases automatically, to quickly scale out and/or rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low-coupling, modularity, and semantic interoperability. At the heart of cloud computing is an infrastructure comprising a network of interconnected nodes.

Figure 3:
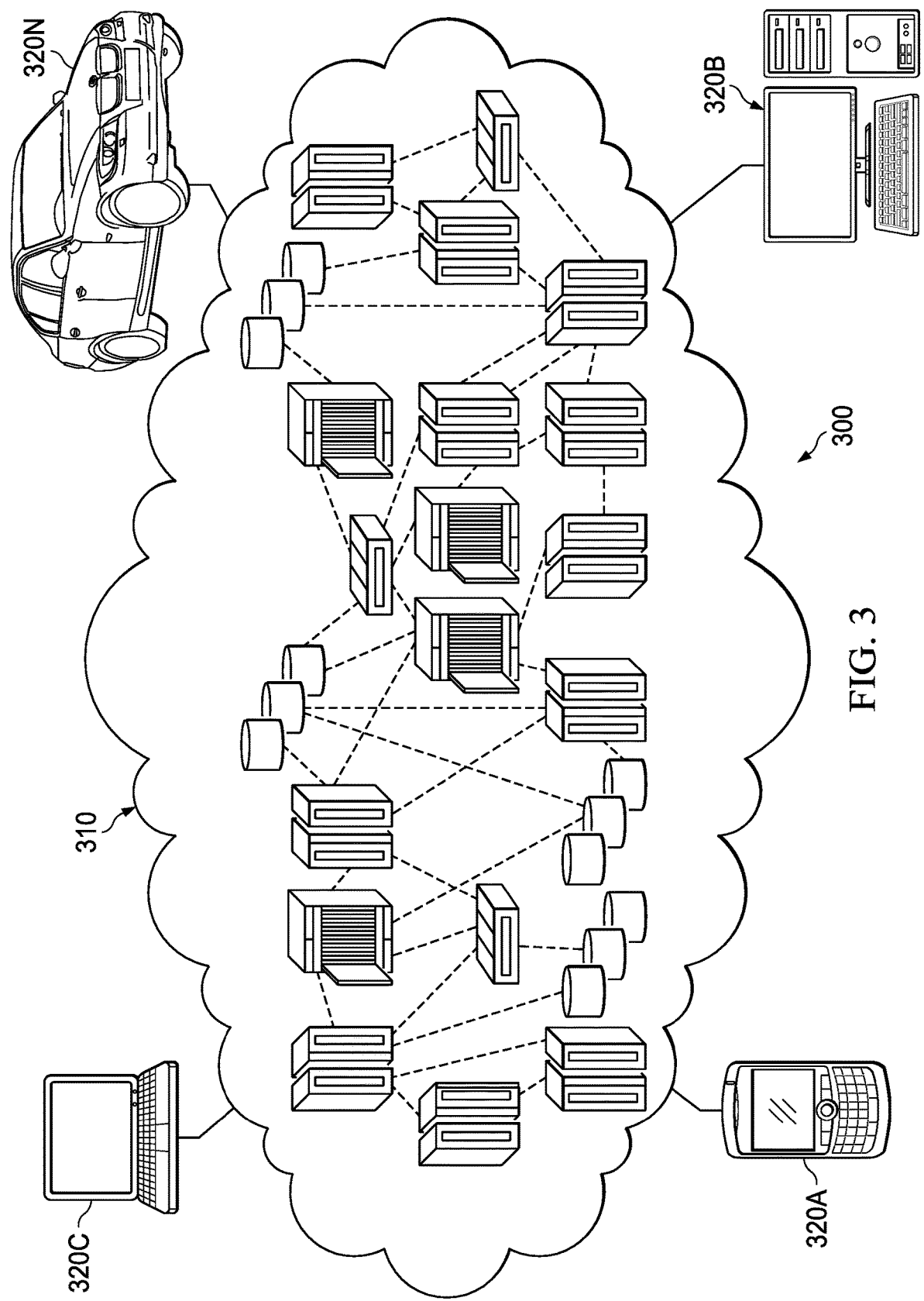
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server computer 104 and server computer 106 in FIG. 1. Local computing devices 320A, 320B, 320C, and 320N may be, for example, clients 112, 114, and 116 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A, 320B, 320C, and 320N. It is understood that the types of local computing devices 320A, 320B, 320C, and 320N are intended to be illustrative only and that cloud computing nodes 310 and cloud computing environment 300 can communicate with any type of computerized device over any type of network and/or network addressable connection using a web browser, for example.

Figure 4:
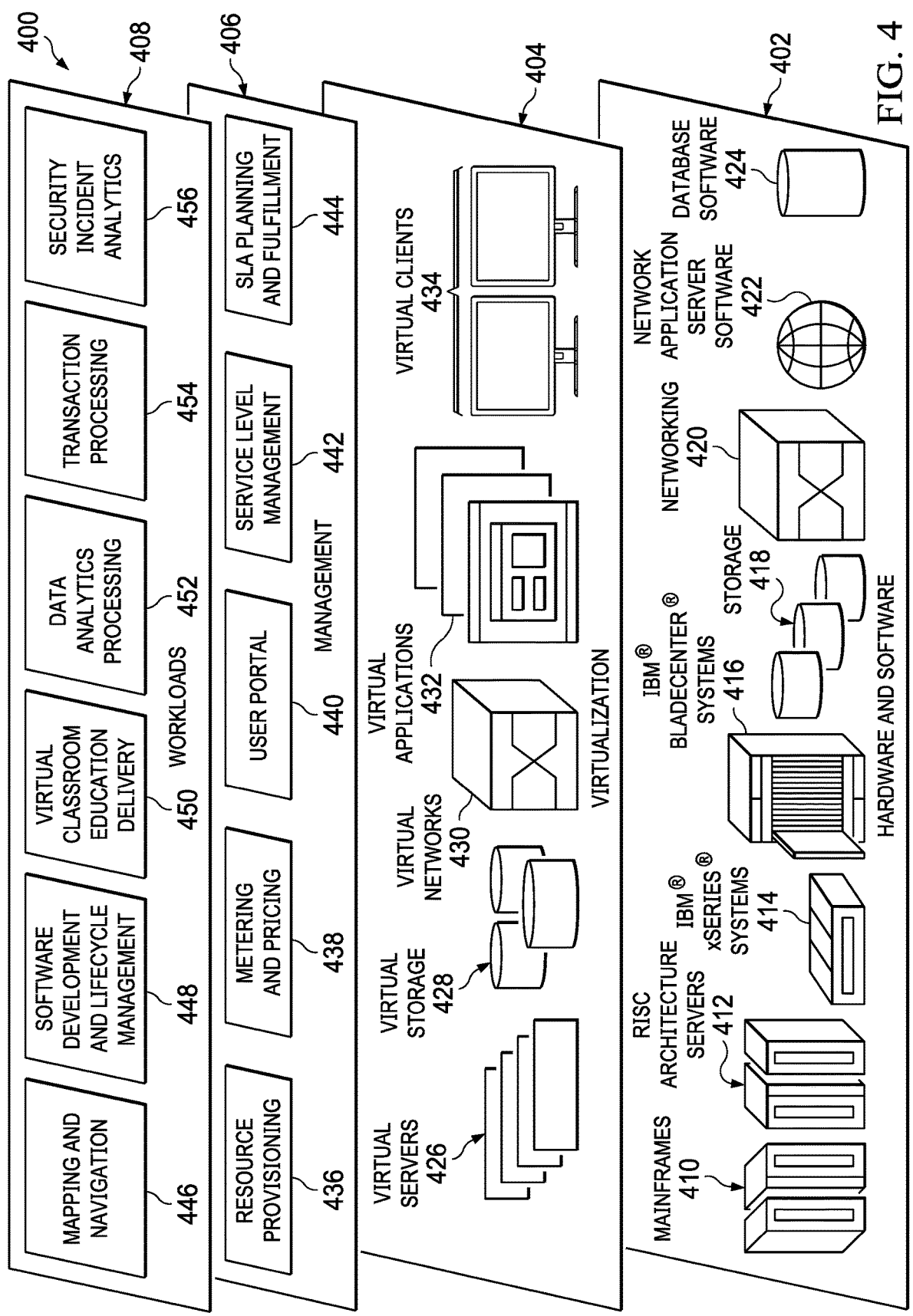
FIG. 4 is a diagram illustrating cloud computing abstraction model layers in accordance with an illustrative embodiment.

With reference now to FIG. 4, a diagram illustrating cloud computing abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture servers 412, servers 414, blade servers 416, storage 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, along with billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and security incident analytics 456.

Figure 5:
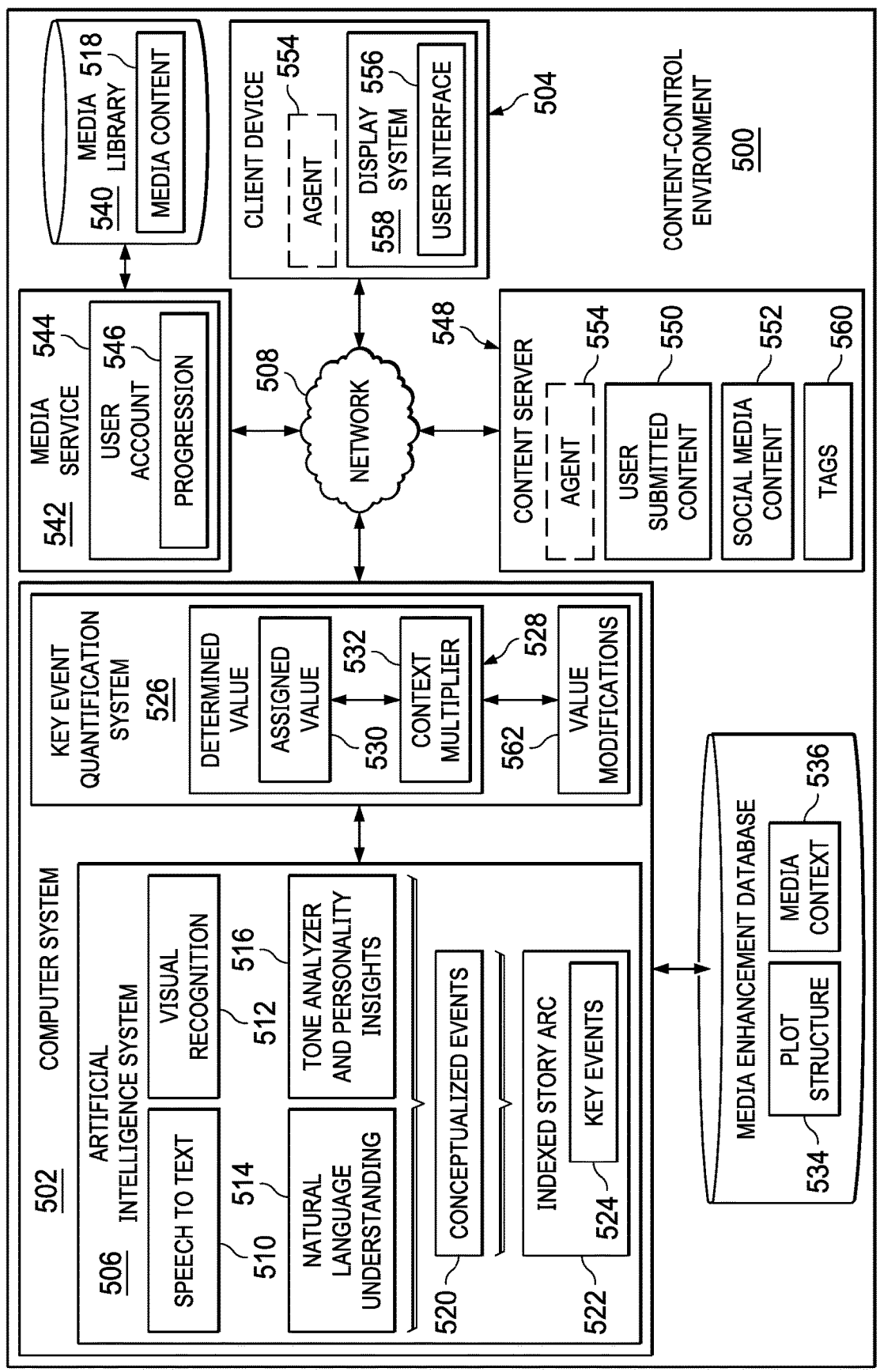
FIG. 5 is a block diagram of a content-control environment in accordance with an illustrative embodiment.

With reference now to FIG. 5, a block diagram of a content-control environment is depicted in accordance with an illustrative embodiment. In this illustrative example, content-control environment 500 includes components that can be implemented in hardware such as the hardware shown in network data processing system 100 in FIG. 1. Content-control environment 500 can be implemented in a cloud computing environment that includes a set of one or more cloud computing nodes, such as cloud computing environment 300 and cloud computing nodes 310 of FIG. 3.

In this illustrative example, Content-control environment 500 includes computer system 502. Computer system 502 is a physical hardware system and includes one or more data processing systems. When more than one data processing system is present in computer system 502, those data processing systems are in communication with each other using a communications medium. The communications medium may be a network. The data processing systems may be selected from at least one of a computer, a server computer, a work station, a tablet computer, or some other suitable data processing system. Client device 504 and Artificial Intelligence System 506 in computer system 502 communicate with each other over a network 508, which can be network 102 in FIG. 1.

References to key events can be any element of a disseminated summary or description of any piece of fiction that reveals plot elements which threaten to give away important details. Typically, the details of the conclusion of the plot, including the climax and ending, are especially regarded as material which other users might like to avoid. References can also be used to refer to any piece of information regarding any part of a given media that a potential consumer would not want to know beforehand. Because enjoyment of fiction depends a great deal upon the suspense of revealing plot details through standard narrative progression, the prior revelation of how things will turn out can detract from the enjoyment that some consumers of the narrative would otherwise have experienced.

It is becoming increasingly difficult to avoid learning of plot twists, big reveals, important events and other references to key events from books, TV shows and other media when on social media or online. People frequently share information (e.g., videos, posts, comments, photos, movie reviews, book reviews, etc.) with other users in a social network. However, the information shared by a user may include references that inadvertently disclose key events to other users. For example, if a user publishes a post describing the unexpected event of a movie or book, this post may inadvertently disclose the surprise to other users.

As depicted, client device 504 can include or access Artificial Intelligence System 506 to detect and to obscure references to key events according to an identified progression through a media. Artificial Intelligence System 506 is a system that has intelligent behavior and can be based on function of a human brain. An Artificial Intelligence System comprises at least one of an artificial neural network, a cognitive system, a Bayesian network, fuzzy logic, an expert system, a natural language system, or some other suitable system. Machine learning is used to train a process or Artificial Intelligence System. Machine learning involves inputting data to the process and allowing the process to adjust and improve the function of the Artificial Intelligence System.

Artificial Intelligence System 506 may be the Watson™ services system available from International Business Machines Corporation of Armonk, N.Y., which is augmented with the mechanisms of the invention described hereafter. The Watson™ system parses an input to extract the major features, that in turn are then applied to a corpus of data. Based on the application to the corpus of data, a set of hypotheses are generated by looking across the corpus of data for portions that have some potential for containing a valuable response to the input. The Watson™ system then performs deep analysis on the language of the input and the portions of the corpus of data found using a variety of reasoning algorithms. There may be hundreds or even thousands of reasoning algorithms applied, each of which performs different analysis, e.g., comparisons, and generates a value. For example, some reasoning algorithms may look at the matching of terms and synonyms within the language of the input and the found portions of the corpus of data. Other reasoning algorithms may look at temporal or spatial features in the language, while others may evaluate the source of the portion of the corpus of data and evaluate its veracity.

The values obtained from the various reasoning algorithms indicate the extent to which the potential response is inferred by the input based on the specific area of focus of that reasoning algorithm. Each resulting value is then weighted against a statistical model. The statistical model captures how well the reasoning algorithm performed at establishing the inference between the data for a particular domain during the training period of the Watson™ system. The statistical model may then be used to summarize a level of confidence that the Watson™ system has regarding the evidence that the potential response, i.e. candidate answer, is inferred by the input. This process may be repeated for each of the candidate answers until the Watson™ system identifies candidate answers that surface as being significantly stronger than others and thus, generates a final answer, or ranked set of answers, for the input query. More information about the Watson™ system may be obtained, for example, from the IBM Corporation website, IBM Redbooks, and the like. For example, information about the Watson™ system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In this illustrative example, Artificial Intelligence System 506 includes a number of cognitive tools configured to conceptualize events from digital media and identify key events in a story arc of the events. As depicted, Artificial Intelligence System 506 includes speech to text 510, visual recognition 512, natural language understanding 514, and tone analyzer and personality insights 516.

Speech to text 510 transcribes audio into text using machine intelligence. Visual recognition 512 identify the contents of an image or video frame. Natural language understanding 514 distills text and dialogue into fundamental concepts of relevance and to understand what concepts and entities are being discussed. Tone analyzer and personality insights 516 documents emotional, writing, and social tone of dialogue, including text from natural language understanding 514.

Artificial Intelligence System 506 delves deep into media content 518 to examine tone and personality, visual recognition (of people, places, objects and more), dialogue, language taxonomy and words/sounds. Using one or more of the cognitive tools, Artificial Intelligence System 506 performs a frame-by-frame, word-by-word, moment-by-moment examination of any meaningful aspect of the media content 518: images, words, sounds, emotions, actors, scriptwriting, objects and more. Artificial Intelligence System 506 then identifies scenes within long-form content and breaks the video into semantically logical scenes, applying one or more of the cognitive tools to analyze and associate identified items with the scenes.

Armed with this expansive collection of data, Artificial Intelligence System 506 then performs intricate analysis of the surfaced data to uncover relationships among these and other indicators, producing previously unseen insights into media content 518. By evaluating audio and textual content using natural language understanding 514 to analyze semantic features of text input provided by speech to text 510—including areas such as categories, concepts, emotion, entities, keywords, metadata, relations, semantic roles, and sentiment—Artificial Intelligence System 506 enables important constructs to rise to the surface, revealing data that can be used to connect disparate ones of conceptualized events 520 into an indexed story arc 522 of important key events 524. Furthermore, Artificial Intelligence System 506 continually improves as new versions of cognitive components are included and as supporting contextual information—such as information obtained from content server 548—change over time.

Based on the indexed story arc 522 of conceptualized events 520, key event quantification system 526 assigns determined value 528 to each identified one of key events 524. The higher the determined value 528, the more likely a particular key events 524 is a key event which other users might like to avoid. In assigning determined value 528, key event quantification system 526 takes into account a number of different insights uncovered by Artificial Intelligence System 506, such as: sentiment/changing sentiments close to the event; cause and effect of the event on the plot; where the event falls on the plot structure (i.e., three-act structure, the hero's journey, or other common literary structures); common events (i.e., the death of a main character), and personality insights on main characters and behavior that is outside of the expected for their determined personality.

In one illustrative example, key event quantification system 526 calculates determined value 528 according to the formula:

$$\Sigma \text{Value} \cdot \text{Multiplier}$$

In this illustrative example, assigned value 530 is an assigned value based on a cause/effect of a plot or character event. Each assigned value 530 may consider several internal factors uncovered by Artificial Intelligence System 506 including but not limited to a number of character references, and amounts of "screen time", a synopsis content, previous events, and a sentiment or tone of the conceptualized events 520 surrounding the particular key events 524.

The following is a list of key events and their respective values and factors that can be utilized in one illustrative example:

Character Death
  Values: 50
  Factors: Character importance
Reveal/Plot Twists)
  Values: 20-50
    Factors: Relationship to main characters, location in plot, plot importance, reactions (behavior/tone) of characters to reveal
Character Decision
  Values: 1-20
    Factors: Character importance, character personality/behavior/tone, plot importance, location in plot
Other Event
  Values: 1

A character death heavily depends on the importance of the character which is reflective of several sub-factors like the amount of time the character is present and engaged in the plot. For example, the death of a minor character early in the story arc may still be a key event; however, there is lesser significance compared to more prevalent characters that have been in several previous scenes, interacted with several minor characters, or have a relationship with one or more major characters.

A reveal or twist in the story can range from some plot significance to being the most significant event. Since reveals can range in significance, there are multiple factors to consider. Relationships to the main characters and reactions of those characters provide insight to how they are dealing with the reveal (which they may have already known about or not). Additionally, the timing and location of the plot adds some weight as a reveal in the beginning of the plot may have significance for a character, but may not contribute to the overarching plot.

Character decisions are similar to plot reveals and twists, but are usually not as significant as a reveal or death. If the content does not have any deaths, then character decisions could make up most of the content. Since character decisions are similar to reveals they have many of the same factors. However, character decisions may drive major events like stories with love triangles or prophesied events.

Lastly, events occur regularly within content. Due to their frequency, values for other events are the lowest, but could be considered a key event in some contexts.

The context multiplier 532 is a fractional value manipulated by several meta factors considering the content. Specifically these factors can include:
1. Plot structure
2. Genre
3. Creator style In this illustrative example, plot structure 534 is a model template used in narrative fiction that divides a story into different parts, e.g., Hero's journey, three-act structure, etc. Books and movie stories often follow similar plot structures. Therefore, once a work is categorized according to a rough plot structure it follows, the plot structure component of the multiplier can be adjusted.

Media context 536 is a set of socially-inferred stylistic criteria or conventions, e.g., aesthetic, rhetorical, communicative, or functional, that can be applied to media content 518. For example, media context 536 can include a genre (e.g., Romantic Comedy, Thriller, Action, Mystery), and a creator style (e.g., Disney animation, director style). For example, a mystery thriller will have a different set of multipliers compared to a romantic comedy. The context multiplier 532 adjusts assigned value 530 based on plot structure 534 and media context 536.

For example, a list of possible ones of context multiplier 532 that can be utilized in one illustrative example to adjust determined value 528 according to a literary plot structure is illustrated in Table 1.

TABLE 1

| Plot Structure | Plot Event | Context Multiplier |
|---|---|---|
| Hero's Journey | Ordinary World | 0.2 |
|  | Call to Adventure | 0.2 |
|  | Refusal of Call | 0.3 |
|  | Meeting with Mentor | 0.4 |

TABLE 1-continued

| Plot Structure | Plot Event | Context Multiplier |
|---|---|---|
| | Crossing the Threshold | 0.6 |
| | Tests, Allies & Enemies | 3 |
| | Approach to the Cave | 2 |
| | The Ordeal | 5 |
| | The Reward | 2 |
| | The Road Back | 1 |
| | The Resurrection | 2 |
| | Return with the Elixir | 1 |
| Three-Act Structure | Act 1 - Beginning | 0.1 |
| | Act 2 - Middle | 2 |
| | Act 2/3 - Climax | 4 |
| | Act 3 - End | 5 |

As depicted, client device 504 is an example of a device that is configured to access media content 518. In this illustrative example, a media content 518 may be part of media library 540 provided by media service 542. Client device 504 accesses media content 518 through user account 544 with media service 542. Media service 542 may track a user's progression 546 as a user accesses and consumes media content 518.

For example, media service 542 may track and store data describing which of media content 518 in media library 540 that a user has accessed or consumed (e.g., a video, a movie). Furthermore, progression 546 may track and store data describing different portions (e.g., chapters, episodes, scenes, etc.) that a user has accessed or consumed within a particular media content 518. For example, progression 546 may indicate that a user has read a number of chapters within a book, has viewed a number of episodes in a series, or has or has watched a number of scenes of a movie.

In this illustrative example, a user can operate client device 504 and access content server 548. Client device 504 can communicate with content server 548 over network 508 using a web browser, for example.

Content server 548 is a computer system that stores content data, such as articles, webpages, social media pages, discussion threads, social media posts, social media shares, social media mentions, and other suitable content that can be accessed using client device 504. As depicted, content server 548 includes one or more of user submitted content 550 and social media content 552. In this illustrative example, user submitted content 550 and social media content 552 include content, including possible key events, that is relevant to media content 518.

As illustrated, one or more of client device 504 and content server 548 includes agent 554. Agent 554 is a computer program or daemon which works on behalf of Artificial Intelligence System 506 to identify references to key events of media content 518 in one or more of user submitted content 550 and social media content 552.

Agent 554 accesses progression 546 to determine an individual user's progress in media content 518. Based on progression 546, agent 554 identifies references to key events in one or more of user submitted content 550 and social media content 552 that are associated with the media content 518. For example, agent 554 may identify references in related content data that are associated with key events having values that exceeds a threshold. Agent 554 obscures the identified references to key events in the one or more of user submitted content 550 and social media content 552 when that content is displayed in user interface 556 on the display system 558 within client device 504.

In another illustrative example, Artificial Intelligence System 506 adjusts and improves the function of key event quantification system 526 by ingesting user submitted content 550 that have tags 560. In this illustrative example, content server 548 includes one or more of review databases, websites, videos, or images that have been tagged with potential key events warnings by other users. Based on this, tags 560, and key event quantification system 526, the system generates user-ranked values and compares the user-ranked values with the Artificial Intelligence generated one of determined value 528 for each of key events 524 to generate value modifications 562. Key event quantification system 526 will adjust its determined value 528 on the value modifications 562 to more accurately identify and quantify the references to key events. For example, value modifications 562 may modify one or more of assigned value 530 or context multiplier 532, e.g. the authors plot style favors personality insights over common literary structures.

The illustration of content-control environment 500 in FIG. 5 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 6:
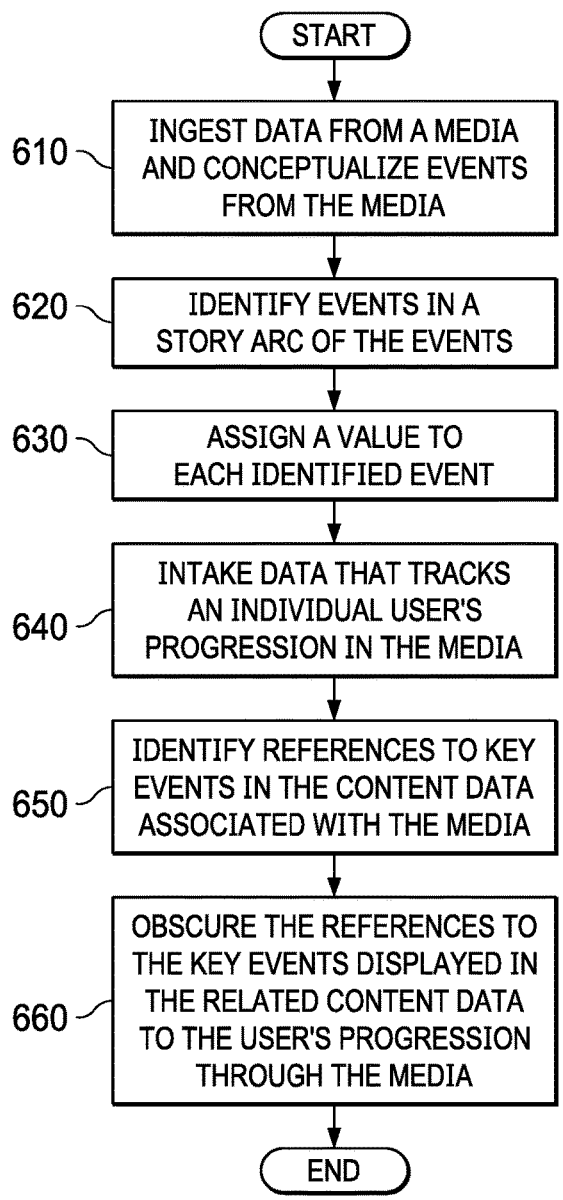
FIG. 6 is a flowchart of a process for detecting and obscuring references to key events according to an identified progression through a media in accordance with an illustrative embodiment.

Turning next to FIG. 6, a flowchart of a process for detecting and obscuring references to key events in related content data according to an identified progress through a media is depicted in accordance with an illustrative embodiment. The processes in FIG. 6 can be implemented in hardware, software, or both. When implemented in software, the processes can take the form of program code that is run by one or more processor units located in one or more hardware devices in one or more computer systems. For example, these processes can be implemented in one or more of Artificial Intelligence System 506 and key event quantification system 526 running on computer system 502 in FIG. 5.

The process begins by ingesting data from a media and conceptualizing events from the media (step 610). The process then will identify events in a story arc of the events (step 620). Then the process will assign a value to each identified event (step 630). The process will then intake data that tracks an individual user's progression in the media (step 640). Afterwards, the process will identify references to key events in the content data associated with the media (step 650). The process will then obscure the references to the key events displayed in the related content data to the user's progression through the media (step 660), with the process terminating thereafter.

Figure 7:
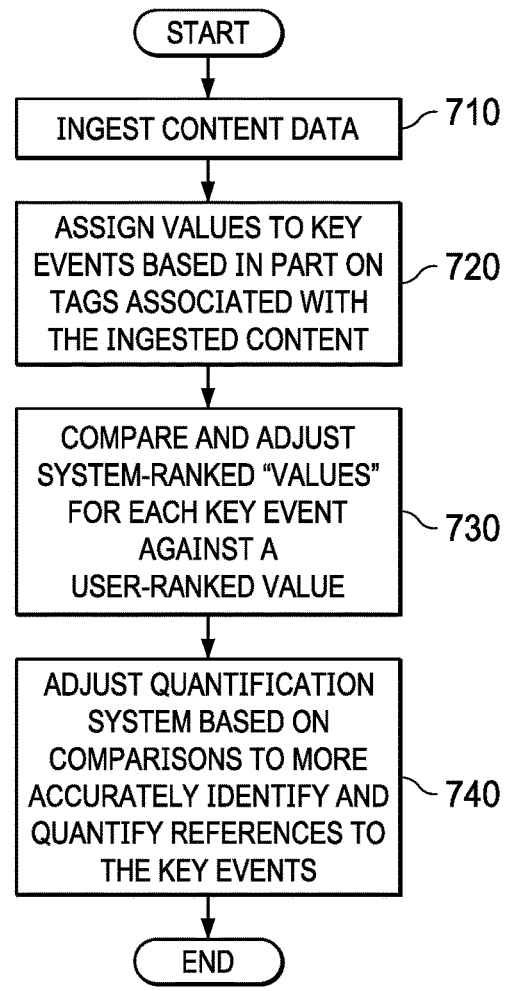
FIG. 7 is a flowchart of a process for augmenting an Artificial Intelligence System based on key events indicated in user submitted content in accordance with an illustrative embodiment.

Turning next to FIG. 7, a flowchart of a process for augmenting an artificial intelligence key event quantification system based on references to key events indicated in user submitted content is depicted in accordance with an illustrative embodiment. The processes in FIG. 7 can be implemented in hardware, software, or both. When implemented in software, the processes can take the form of program code that is run by one of more processor units located in one or more hardware devices in one or more computer systems. For example, these processes can be implemented in one or more of Artificial Intelligence System 506 and key event quantification system 526 running on computer system 502 in FIG. 5.

The process begins by ingesting content data (step 710). The content data can be ingested from the content server 548 shown in block form in FIG. 5. For example, the ingested content can include, for example one or more review databases, videos, images, and websites, such as Rotten Tomatoes, Goodreads, and Spark Notes. The ingested content can include user submitted content 550 shown in block form in FIG. 5, such as direct user feedback regarding missed key event blocking, and user comments from website forums. The ingested content can include social media content 552 shown in block form in FIG. 5, such as social media posts, shares, likes, and mentions. The ingested content data can include one or more of tags and warnings associated with particular key events of a media content.

The process continues by assigning values to key events based in part on the tags associated with the ingested content (step 720). In one illustrative example, the process may use natural language understanding 514 of Artificial Intelligence System 506, both shown in block form in FIG. 5, to identify content relevant to key events 524. The process records all mentions of key events in the ingested content that are associated with warning words like and user-specified feedback. The system assigns a percentage value to key events based on a ratio of warning mentions to total mentions for each key event.

The process then will compare and adjust the system-ranked "values" for each key event against a user-ranked value (step 730). For example, in one illustrative example, the process can compare the percentage value determined in step 720 to determined value 528 as determined by key event quantification system 526 of FIG. 5.

For example, key event quantification system 526 may initially determine a high one of determined value 528 for a key event regarding a significant character death. However, if the event has low percentage value as determined from key event mentions of online ingested content, the process may reduce determined value 528. Conversely, an initial low one of determined value 528 for a seemingly insignificant event can be increased, for example if the event causes a massive debate spanning thousands of angry replies, as determined from the ingested content.

The process then adjusts its quantification system based on comparisons to more accurately identify and quantify references to the key events (step 740), with the process terminating thereafter.

For example, the plot style of a particular author may favor personality insights over literary structures, resulting in an incorrect key event determination for each event. The process takes the differences in the system-ranked "values" and the percentage value determined from ingested content. Using Artificial Intelligence System 506, the process analyzes the differences to determine any incorrect categorization of plot structure or media context, such as for example an incorrect genre, plot structure, and author style assumption. The process can then adjust the quantification system by applying one or more value modifications 562 that modify one or more of assigned value 530, context multiplier 532, plot structure 534 and media context 536.

Thus, the illustrative embodiments provide a method, apparatus, system, and computer program product for detecting and obscuring references to key events in related content data according to an identified progress through a media. The computer system ingests data from the media and conceptualizes events from the media. The computer system identifies key events in the media based on the conceptualized events. The computer system assigns a value to each identified key event. The computer system intakes data that tracks a progression through the media. The computer system identifies references to key events in content data associated with the media. The system obscures the references to key events displayed in the related content data according to the progression through the media.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for detecting and obscuring references to key events in related content data according to an identified progress through a media, the method comprising:
    ingesting, by a computer system, data from the media and conceptualizing events from the data;
    identifying, by the computer system, the key events in the media based on the conceptualized events;
    determining, by the computer system, a value for each identified key event;
    intaking, by the computer system, data that tracks a progression through the media;
    identifying, by the computer system, references in the related content data that are associated with the key events having values that exceeds a threshold; and
    obscuring, by the computer system, the references displayed in the related content data according to the progression through the media, wherein obscuring the references displayed in the related content data further comprises:
    obscuring, by the computer system, the references in the related content data by hiding, blurring, or otherwise obscuring a display of the references; and
    displaying, by the computer system, an interactive warning in conjunction with the references in the related content data, wherein an unobscured view of the references is displayed in response to receiving an interaction with the interactive warning.

2. The method of claim 1, wherein the steps of conceptualizing the events and identifying the key events further comprises:
    applying a number of cognitive tools of an Artificial Intelligence System to the data to conceptualize the events and identify the key events.

3. The method of claim 2, wherein the number of cognitive tools comprises:
    a speech to text tool that uses machine intelligence of the Artificial Intelligence System to transcribe audio data of the media into text;
    a visual recognition tool that uses machine intelligence of the Artificial Intelligence System to identify contents of an image or video frame of the media;
    a natural language understanding tool that uses machine intelligence of the Artificial Intelligence System to distill text transcribed by the speech to text tool into fundamental concepts of relevance and to understand what concepts and entities are being discussed; and
    a tone analyzer and personality insights tool that uses machine intelligence of the Artificial Intelligence System to document emotional, writing, and social tone of the text transcribed by the speech to text tool.

4. The method of claim 1, wherein identifying references to the key events in the related content data associated with the media further comprises:
   correlating, by the computer system, the related content data to at least one of the conceptualized events; and
   identifying, by the computer system, the references in the related content data based on the progression through the media.

5. The method of claim 1, wherein the value is a first value for the key event, the method further comprising:
   ingesting, by the computer system, user input data, wherein the user input data includes at least one of a tag or a warning associated with the key events;
   assigning, by the computer system, a second value to the key events based on the user input data;
   comparing, by the computer system, the first value against the second value; and
   adjusting, by the computer system, a quantification algorithm based on a comparison to more accurately identify and quantify the key events.

6. The method of claim 5, wherein the user input data comprises data having warnings identified from at least one of databases, websites, videos, or images.

7. A computer system comprising:
   a bus system;
   a storage device connected to the bus system, wherein the storage device stores program instructions; and
   a processor connected to the bus system, wherein the processor executes the program instructions:
      to ingest data from a media and to conceptualize events from the media;
      to identify key events in the media based on the conceptualized events;
      to determine a value for each identified key event;
      to intake data that tracks a progression through the media;
      to identify references in related content data associated with the key events having values that exceeds a threshold; and
      to obscure the references displayed in the related content data according to the progression through the media, wherein in obscuring the references displayed in the related content data, the processor further executes the program instructions:
      to obscure the references in the related content data by hiding, blurring, or otherwise obscuring a display of the references to the key events; and
      to display an interactive warning in conjunction with the references in the related content data, wherein an unobscured view of the references is displayed in response to receiving a user interaction with the interactive warning.

8. The computer system of claim 7, wherein in conceptualizing the events and identifying the key events, the processor further executes the program instructions:
   to apply a number of cognitive tools of an Artificial Intelligence System to the data to conceptualize the events and identify the key events.

9. The computer system of claim 8, wherein the number of cognitive tools comprises:
   a speech to text tool that uses machine intelligence of the Artificial Intelligence System to transcribe audio data of the media into text;
   a visual recognition tool that uses machine intelligence of the Artificial Intelligence System to identify contents of an image or video frame of the media into text;
   a natural language understanding tool that uses machine intelligence of the Artificial Intelligence System to distill text transcribed by the speech to text tool into fundamental concepts of relevance and to understand what concepts and entities are being discussed; and
   a tone analyzer and personality insights tool that uses machine intelligence of the Artificial Intelligence System to document emotional, writing, and social tone of the text transcribed by the speech to text tool.

10. The computer system of claim 7, wherein in identifying the references in the related content data associated with the media, the processor further executes the program instructions:
   to correlate the related content data to at least one of the conceptualized events; and
   to identify the references in the related content data based on the progression through the media.

11. The computer system of claim 7, wherein the value is a first value for the key event, wherein the processor further executes the program instructions:
   to ingest user input data, wherein the user input data includes at least one of a tag or a warning associated with the key events;
   to assign a second value to the key events based on the user input data;
   to compare the first value against the second value; and
   to adjust a quantification algorithm based on a comparison to more accurately identify and quantify the key events.

12. The computer system of claim 11, wherein the user input data comprises data having warnings identified from at least one of databases, websites, videos, or images.

13. A computer program product comprising a computer readable storage medium having program code stored thereon, the program code being executable by a computer to cause the computer to perform a method comprising:
   ingesting data from a media and conceptualizing events from the media;
   identifying key events in the media based on the conceptualized events;
   assigning a value to each identified key event;
   intaking data that tracks a progression through the media;
   identifying references in related content data that are associated with the key events having values that exceed a threshold; and
   obscuring the references displayed in the related content data according to the progression through the media, wherein the step of obscuring the references displayed in the related content data further comprises:
   obscuring the references in the related content data by hiding, blurring, or otherwise obscuring a display of the references to the key events; and
   displaying an interactive warning in conjunction with the references in the related content data, wherein an unobscured view of the references is displayed in response to receiving a user interaction with the interactive warning.

14. The computer program product of claim 13, wherein the steps of conceptualizing the events and identifying the key events further comprises:
   applying a number of cognitive tools of an Artificial Intelligence System to the data to conceptualize the events and identify the key events.

15. The computer program product of claim 14, wherein the number of cognitive tools comprises:
   a speech to text tool that uses machine intelligence of the Artificial Intelligence System to transcribe audio data of the media into text;

a visual recognition tool that uses machine intelligence of the Artificial Intelligence System to identify contents of an image or video frame of the media into text;

a natural language understanding tool that uses machine intelligence of the Artificial Intelligence System to distill text transcribed by the speech to text tool into fundamental concepts of relevance and to understand what concepts and entities are being discussed; and a tone analyzer and personality insights tool that uses machine intelligence of the Artificial Intelligence System to document emotional, writing, and social tone of the text transcribed by the speech to text tool.

16. The computer program product of claim 13, wherein the step of identifying the references in the related content data associated with the media further comprises:

correlating the related content data to at least one of the conceptualized events; and identifying the references in the related content data based on the progression through the media.

17. The computer program product of claim 13, wherein the value is a first value, the method further comprising:

ingesting user input data, wherein the user input data includes at least one of a tag or a warning associated with the key events;

assigning a second value to the key events based on the user input data;

comparing the first values against the second value; and adjusting a quantification algorithm based on a comparison to more accurately identify and quantify the key events.

* * * * *